United States Patent
Kang

(10) Patent No.: US 7,629,767 B2
(45) Date of Patent: Dec. 8, 2009

(54) MOBILE COMMUNICATION TERMINAL HAVING USB INTERFACE UNIT THEREIN

(75) Inventor: Ji-Eun Kang, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 435 days.

(21) Appl. No.: 11/243,956

(22) Filed: Oct. 4, 2005

(65) Prior Publication Data

US 2006/0071635 A1 Apr. 6, 2006

(30) Foreign Application Priority Data

Oct. 5, 2004 (KR) ................. 10-2004-0079167

(51) Int. Cl.
*H02J 7/00* (2006.01)
(52) U.S. Cl. ..................... 320/112; 320/114
(58) Field of Classification Search .......... 320/108, 320/107, 110, 112, 113, 114
See application file for complete search history.

(56) References Cited

U.S. PATENT DOCUMENTS 6,626,703 B2 * 9/2003 Hsin ................ 439/638
2003/0008563 A1 * 1/2003 Nishio et al. ............ 439/625
2004/0251873 A1 * 12/2004 Simoes et al. ........... 320/114
2005/0077869 A1 * 4/2005 Yueh ..................... 320/114
2005/0168191 A1 * 8/2005 Lee et al. ................ 320/114

FOREIGN PATENT DOCUMENTS

| CN | 1485945 | 3/2004 |
| CN | 2607706 Y | 3/2004 |
| KR | 1020020076042 A | 10/2002 |

* cited by examiner

*Primary Examiner*—Matthew V Nguyen
*Assistant Examiner*—Nguyen Tran
(74) *Attorney, Agent, or Firm*—Lee, Hong, Degerman, Kang & Waimey

(57) ABSTRACT

Disclosed is a mobile communication terminal having a universal serial bus (USB) interface unit therein and particularly, a mobile communication terminal in which a USB interface unit is mounted to a battery. USB contacts are formed at a board of a body and a battery, respectively, a USB interface unit is provided at an upper portion of the battery, and then the battery is mounted upside down to the terminal, such that the USB interface unit is inserted into an outside device and accordingly the USB communications are performed. Therefore, the mobile communication terminal cannot only download the data but also be recharged through, for example, a computer.

7 Claims, 3 Drawing Sheets

MOBILE COMMUNICATION TERMINAL HAVING USB INTERFACE UNIT THEREIN

CROSS REFERENCE TO RELATED APPLICATIONS

Pursuant to 35 U.S.C. § 119(a), this application claims the benefit of earlier filing date and right of priority to Korean Application No. 10-2004-79167, filed on Oct. 5, 2004, the contents of which are hereby incorporated by reference herein in their entirety.

BACKGROUND OF THE INVENTION

1. Field of the Invention

The present invention relates to a mobile communication terminal, and particularly, to a mobile communication terminal in which a USB (Universal Serial Bus) interface unit is mounted to a battery.

2. Description of the Background Art

As communications technology is developed rapidly these days and the requirements of users are increased, composite mobile communication terminals that provide various functions besides a simple calling function (e.g., terminals providing a digital camera function and/or an MP3 function) are being released.

All the terminals require large capacity storage devices, and especially, USB (Universal Serial Bus) communications are very important to the terminals providing the MP3 function.

In order to perform the USB communications, the user should carry along a USB cable. However, because carrying the USB cable all the time is substantially impossible, the user can perform the USB communications only in limited places (e.g., home or office).

SUMMARY OF THE INVENTION

Therefore, an object of the present invention is to provide a mobile communication terminal having a USB interface unit therein.

Another object of the present invention is to provide a battery for a mobile communication terminal having a USB interface unit.

To achieve these and other advantages and in accordance with the purpose of the present invention, as embodied and broadly described herein, there is provided a mobile communication terminal comprising: a terminal body; a battery having a USB interface unit; a mounting portion formed at an upper side of a rear surface of the terminal body, to which the USB interface unit is mounted; and an insertion groove formed at a bottom surface of the terminal body, in which the USB interface unit is inserted when the battery is coupled upside down to the terminal.

Preferably, the insertion groove is placed at an upper portion of the bottom surface of the terminal body.

Preferably, the battery comprises: a battery pack; a USB interface unit formed at an upper end of the battery pack; first USB contacts formed at an upper portion of the battery pack; first and second battery contacts respectively formed at upper and lower portions of the battery pack; and first and second locking protrusions formed at upper and lower portions of the battery pack, respectively.

Preferably, the first battery contact supplies power to the terminal when the battery is coupled upside down to the body to perform the USB communications, and the second battery contact supplies power to the terminal when the battery is normally coupled to the body and thusly, the USB communications are not performed.

Preferably, the first USB contacts are formed at the right and left sides of the first battery contact.

Preferably, the first locking protrusion is coupled to a locker when the battery pack is normally coupled to the terminal, and the second locking protrusion is coupled to the locker when the battery pack is coupled to the terminal upside down.

The mobile communication terminal further comprises a second USB contact and a third battery contact formed at a lower portion of a board of the body and connected to the first USB contacts of the battery and the first or second battery contact, respectively.

Preferably, the second USB contact is connected to the first USB contact when the battery is coupled upside down to the body.

Preferably, the third battery contact is connected to the second battery contact when the battery is normally coupled to the body, and is connected to the first battery contact when the battery is coupled upside down to the body.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The present invention proposes a USB interface unit structure of a mobile communication terminal that can perform the USB communications without a USB cable. To this end, in the present invention, a USB interface unit is mounted at a battery of the mobile communication terminal (hereinafter, referred to as a terminal).

Figure 1:
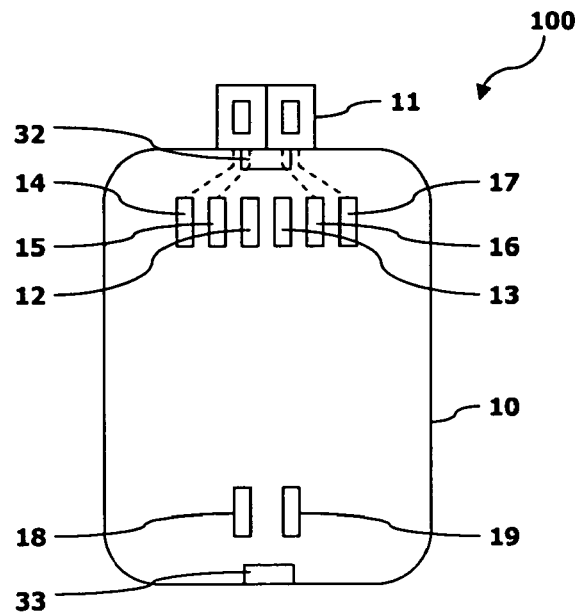
FIG. 1 is a perspective view of a battery in accordance with an embodiment of the present invention.

FIG. 1 is a perspective view of a battery 100 in accordance with an embodiment of the present invention.

As shown, the battery 100 in accordance with the present invention includes a battery pack 10, a USB jack 11 outwardly protruding from an upper end of the battery pack 10, battery terminals 12 and 13 formed at upper central portion of the battery pack 10, USB terminals 14-17 formed at right and left sides of the battery terminals 12 and 13, battery terminals 18, 19 formed at a lower central portion of the battery pack 10, and locking protrusions 32 and 33 formed at an upper end and a lower end of the battery pack 10, respectively.

The USB terminals 14-17 are a ground terminal 14, USB data input/output terminals 15 and 16, and a USB power terminal 17, respectively. Each of the USB terminals 14-17 is connected to the USB jack 11.

When the battery 100 is coupled upside down to the terminal (when the USB communications are performed), the battery terminals 12 and 13 supply power to the terminal. When the battery 100 is normally coupled to the terminal (when the USB communications are not performed), the battery terminals 18 and 19 supply power to the terminal.

Figure 2:
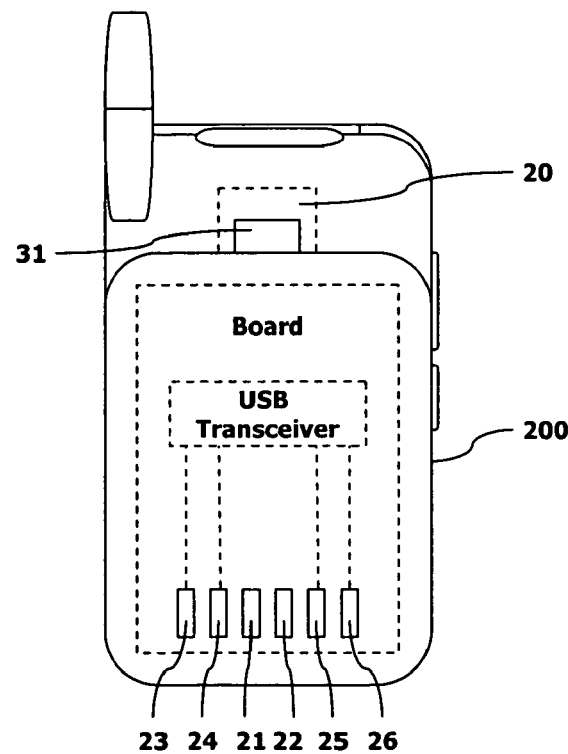
FIG. 2 is a perspective view which illustrates a rear surface of a mobile communication terminal to which a battery in accordance with the present invention is coupled.

FIG. 2 is a perspective view which illustrates a rear surface of the mobile communication terminal to which the battery 100 is mounted.

Figure 3:
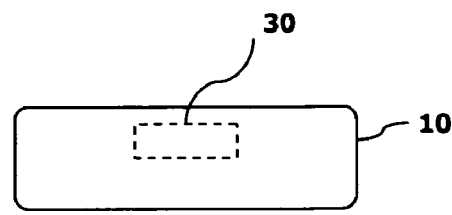
FIG. 3 is a bottom perspective view of a mobile communication terminal, which illustrates a USB interface unit insertion groove in which a USB interface unit is inserted in accordance with the present invention.

Referring to FIG. 2, a board of the mobile communication terminal 200 is provided with battery terminals 21 and 22 and USB terminals 23-26 respectively connected to the battery terminals 12 and 13 and the USB terminals 14-17 of the battery 100 when the USB communication is performed. Also, the terminal 200 includes a USB jack mounting portion 20 for hiding the USB jack 11 when the USB communication is not performed, and a locker 31 coupled to the locking protrusion 32 or 33. As shown in FIG. 3, a USB jack insertion groove 40 for protruding the USB jack 11 to the outside when the USB communication is performed is formed at a bottom surface of the terminal. Preferably, the insertion groove 30 is placed at an upper portion of the bottom surface of the terminal.

The USB terminals 23-26 are a ground terminal 23, USB data input/output terminals 24 and 25, and a USB power terminal 26, and interface with a USB transceiver of a main body. Also, the battery terminals 21 and 22 are connected to the battery terminals 18 and 19 when the battery is normally coupled to the terminal 200 (when the USB communications are not performed). When the battery 100 is coupled upside down to the terminal 200 (when the USB communications are performed), the battery terminals 21 and 22 are connected to the battery terminals 12 and 13 to supply power to the terminal 200.

The operation of the battery 100 having a USB jack and the terminal 200 to which the battery is mounted in accordance with the present invention will now be described.

Figure 4:
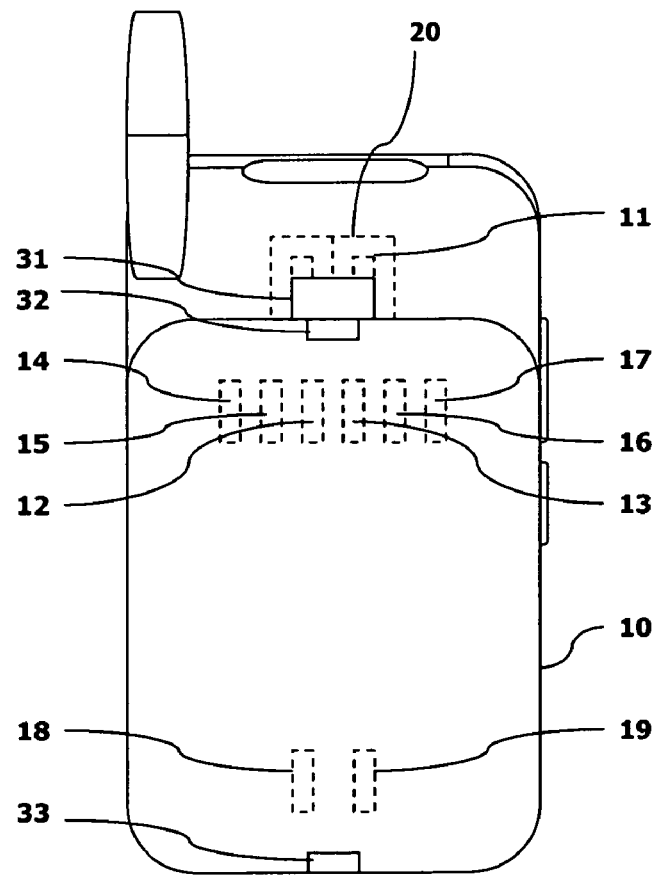
FIG. 4 is a view which shows coupling between the mobile communication terminal and the battery when the USB communications are not performed.

FIG. 4 is a view which shows coupling between a terminal and a battery when the USB communications are not performed.

As shown, when the USB communications are not performed, the battery is normally coupled to the terminal. When the battery is normally coupled to the terminal, the USB jack 11 is inserted in the USB jack mounting portion 20 of the terminal, and the locker 31 is coupled to the locking protrusion 32. Here, the battery terminals 21 and 22 of the terminal are connected to the battery terminals 18 and 19 of the battery, to thereby supply power to the terminal.

Figure 5:
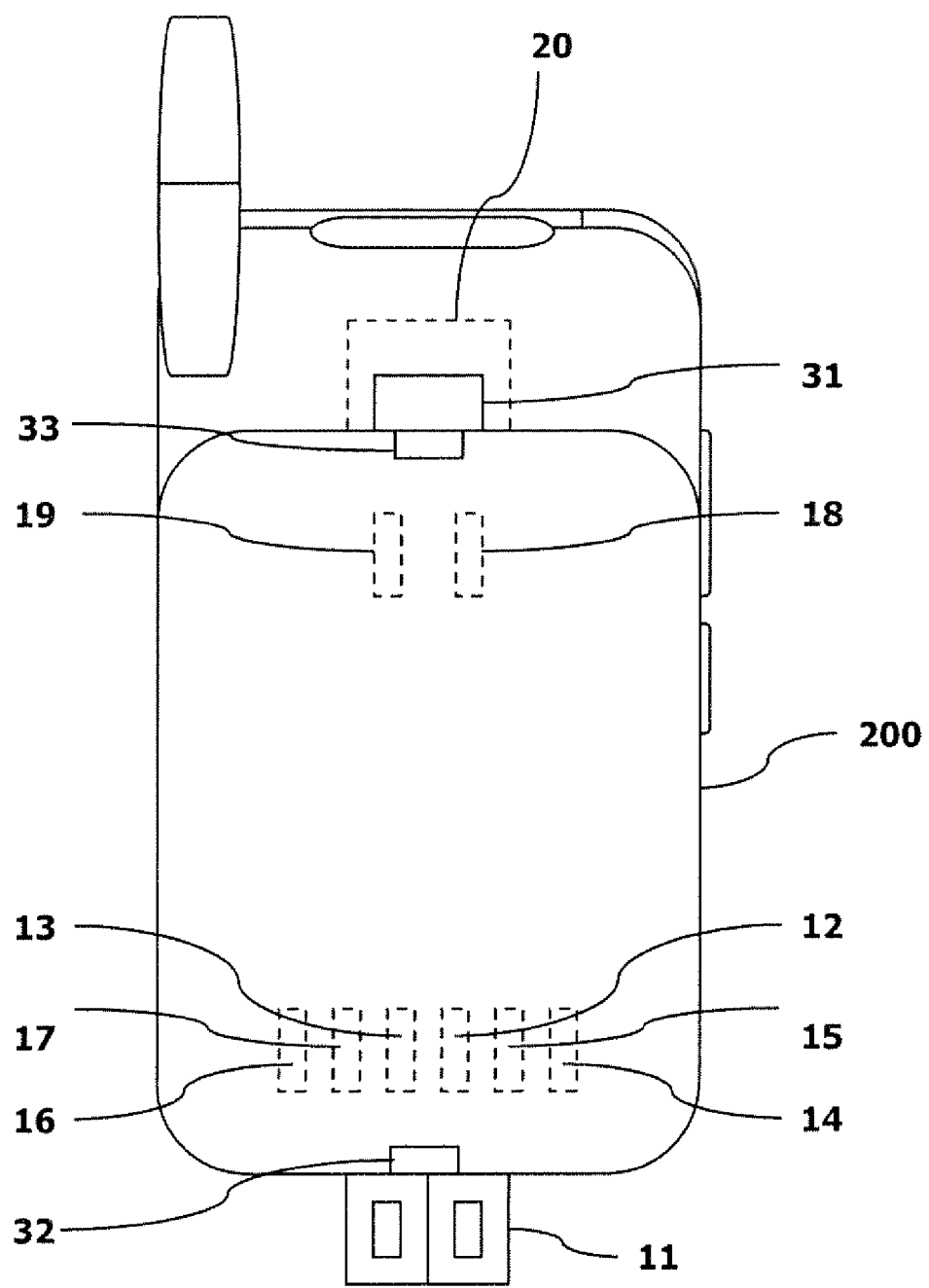
FIG. 5 is a view which shows coupling between the mobile communication terminal and the battery when the USB communications are not performed.

FIG. 5 is a view which illustrates coupling between the terminal and the battery when the USB communications are performed.

As shown, when a user performs the USB communications, the battery is mounted upside down to the terminal. When the battery is coupled upside down to the terminal 200, the USB jack 11 is inserted in the USB jack insertion groove 30 to protrude outside of the terminal, and the locker 31 is coupled to the locking protrusion 33.

Once the USB jack 11 is inserted in the USB jack insertion groove 30, the USB terminals 23-26 of the terminal are connected to the USB terminals 14-17 of the battery, and the battery terminals 21 and 22 of the terminal are connected to the battery terminals 12 and 13 of the battery, to supply power to the terminal.

Accordingly, as the user inserts the USB jack 11, which has protruded downwardly from the terminal through the USB jack insertion groove 30, into a USB port of a computer, data can be downloaded or uploaded through the USB communications. Particularly, the terminal 200 may be recharged through the USB.

As described so far, in the present invention, USB terminals are formed at a terminal board and at a battery, and a jack is provided at an upper portion of the battery. Accordingly, the USB communication may be performed anywhere without a USB cable, such that the terminal may be recharged or download data through a computer.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A battery for a mobile communication terminal, comprising:
    a battery pack; and
    a universal serial bus (USB) interface unit formed on at least one side of the battery pack, wherein the USB interface protrudes beyond an upper edge of the battery pack;
    a plurality of battery contacts located on an outside surface of the battery pack and connecting the battery pack to the mobile communication terminal, the plurality of battery contacts comprising a first battery contact formed at an upper central portion of the battery pack and a second battery contact formed at a lower central portion of the battery pack; and
    at least a first locking protrusion formed at an upper end of the battery pack and a second locking protrusion formed at a lower end of the battery pack,
    wherein the first battery contact is configured to supply power to the mobile communication terminal when the battery pack is coupled to the mobile communication terminal in a USB communication configuration, and the second battery contact is configured to supply power to the mobile communication terminal when the battery pack is coupled to the mobile communication terminal in a standard configuration.

2. The battery of claim 1, further comprising:
    a plurality of USB contacts connecting the USB interface unit to the mobile communication terminal.

3. The battery of claim 1 wherein the first locking protrusion is coupled to a locker when the battery pack is normally coupled to the mobile communication terminal in the standard configuration, and the second locking protrusion is coupled to the locker when the battery pack is coupled to the mobile communication terminal upside down in the USB communication configuration.

4. A mobile communication terminal, comprising:
a body;
a battery for supplying a power to the mobile communication terminal, the battery comprising:
a battery pack;
a universal serial bus (USB) interface unit formed at one side of the battery pack and protruding beyond an upper edge of the battery pack;
a plurality of battery contacts formed on an outside surface of the battery pack and connecting the battery pack to the mobile communication terminal, the plurality of battery contacts comprising a first battery contact formed at an upper central portion of the battery pack and a second battery contact formed at a lower central portion of the battery pack; and
at least a first locking protrusion formed at an upper end of the battery pack and a second locking protrusion formed at a lower end of the battery pack;
a mounting portion for receiving the USB interface unit in the body wherein the battery is connected to the body,
wherein the first battery contact is configured to supply power to the mobile communication terminal when the battery pack is coupled to the mobile communication terminal in the USB communication configuration, and the second battery contact is configured to supply power to the mobile communication terminal when the battery pack is coupled to the mobile communication terminal in the standard configuration.

5. The mobile communication terminal of claim 4, further comprising:
an insertion groove for receiving the USB interface unit in the body, in which the USB interface unit is inserted when the battery is coupled upside down to the body.

6. The mobile communication terminal of claim 5, wherein the insertion groove is located at an upper portion of the bottom surface of the terminal body.

7. The mobile communication terminal of claim 4, wherein the first locking protrusion is coupled to a locker when the battery pack is normally coupled to the mobile communication terminal in the standard configuration, and the second locking protrusion is coupled to the locker when the battery pack is coupled to the mobile communication terminal upside down in the USB communication configuration.

* * * * *